Figure 4:
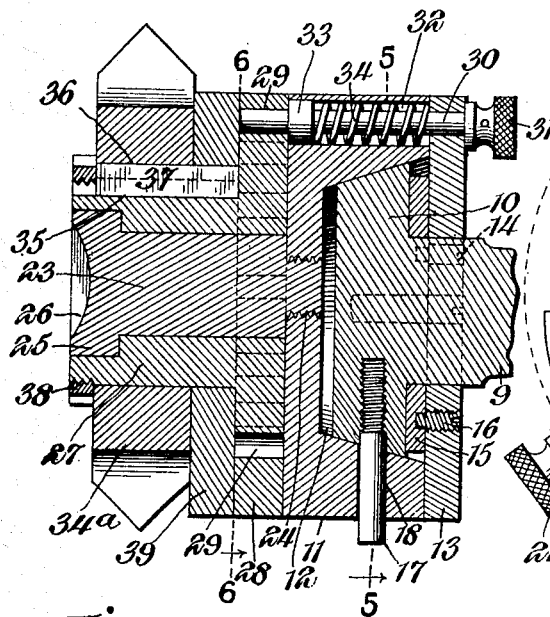

C. E. KLINK & C. H. HERZOG.
MILLING CUTTER SHARPENING DEVICE.
APPLICATION FILED FEB. 13, 1908.
916,452.
Patented Mar. 30, 1909.
2 SHEETS—SHEET 1.
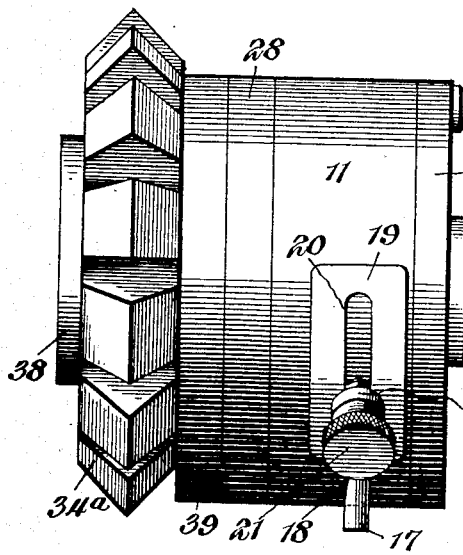
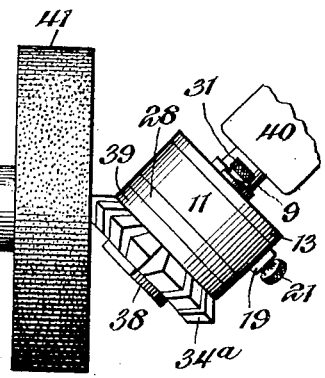
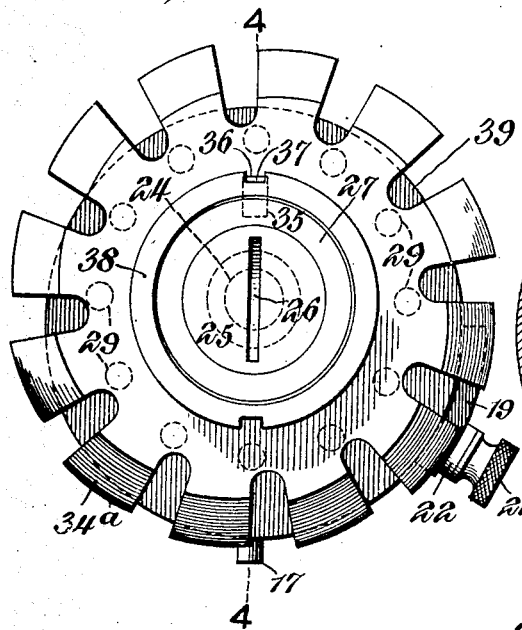
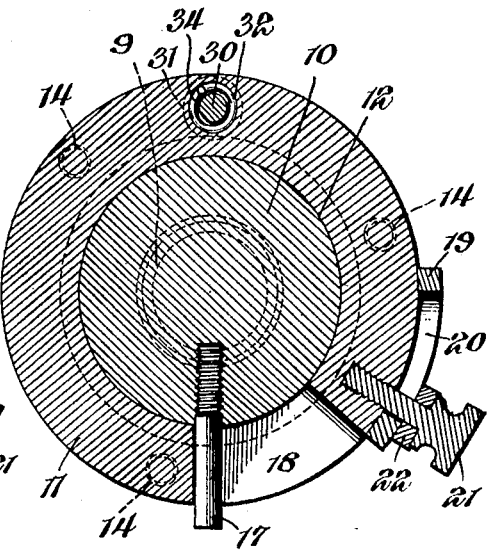
Charles E. Klink
and Charles H. Herzog, Inventors
Witnesses C. E. KLINK & C. H. HERZOG.
MILLING CUTTER SHARPENING DEVICE.
APPLICATION FILED FEB. 13, 1908.

916,452.

Patented Mar. 30, 1909.
2 SHEETS—SHEET 2.

Witnesses
Howard T. Orr.

Charles E. Klink
and Charles H. Herzog, Inventors,
By
C. G. Siggers.
Attorney

UNITED STATES PATENT OFFICE.

CHARLES E. KLINK AND CHARLES H. HERZOG, OF KINGSTON, PENNSYLVANIA.

MILLING-CUTTER-SHARPENING DEVICE.

No. 916,452.  Specification of Letters Patent.  Patented March 30, 1909.

Application filed February 13, 1908. Serial No. 415,729.

*To all whom it may concern:*

Be it known that we, CHARLES E. KLINK and CHARLES H. HERZOG, citizens of the United States, residing at Kingston, in the county of Luzerne and State of Pennsylvania, have invented a new and useful Milling-Cutter-Sharpening Device, of which the following is a specification.

The primary object of the present invention is to provide a novel, simple and entirely practicable means for sharpening angular milling cutters by grinding the relief surfaces of the teeth thereof, said means producing a perfect mill with each tooth of the same length and bevel.

A further object is to provide means of the above character that is readily applicable to practically any grinding machine.

The one great objection to the use of milling cutters constructed of high speed steel has been the fact that the hardening process leaves a heavy rough scale sufficient to cause the cutter to be inaccurate so that good results cannot be obtained, and consequently the cutter cannot be used on accurate work. Even carbon steel will change to such an extent that it is ordinarily worthless where high grade work is required. Experience has demonstrated, however, that by means of the present invention, a cutter constructed of high speed steel, regardless of how much it may be scaled up in the hardening process, can be brought to a stage of perfection that will permit its successful use on work of the most accurate character. It is furthermore well known to those skilled in the art that in hardening the cutter, the shape of the same is often changed due to the unequal expansion and contraction of the metal, and while this change is usually very slight, it is often enough to cause the teeth to be of unequal length so that sometimes less than one-third of the entire number do the work that should be done by all. By means of the present invention, every tooth of a milling cutter may be ground to the same length so that all will be cut, resulting in a mill that can be run at a higher rate of speed and with a higher degree of efficiency. Another advantage is that it eliminates the necessity of the accurate and very expensive master tool now ordinarily employed. Furthermore by grinding the relief faces of the teeth not only is much time saved, but not nearly as much of the body of the tooth has to be cut away as with the method now ordinarily employed, of grinding the front faces of the teeth.

The preferred form of construction is illustrated in the accompanying drawings, but it will be clearly evident by reference to the appended claims that the invention is by no means limited to the embodiment disclosed.

Figure 3:
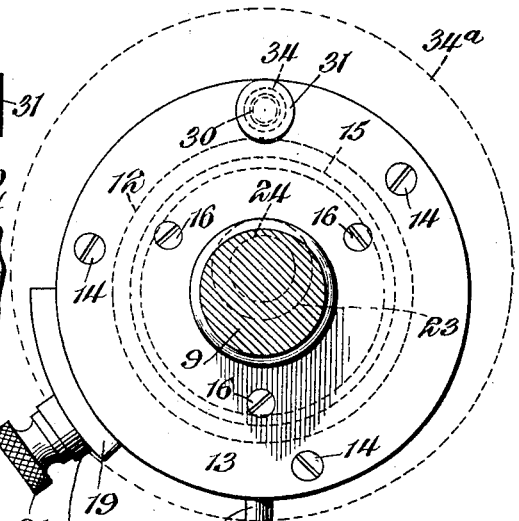
Figure 6:
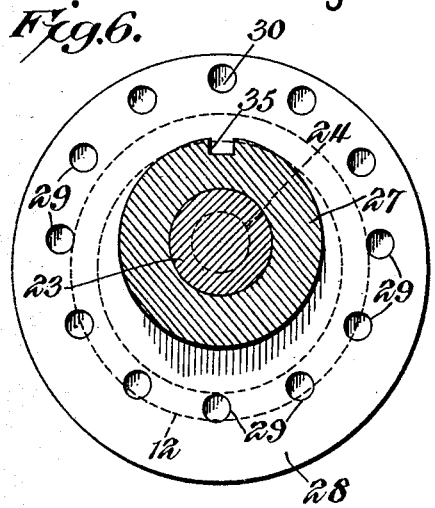
Figure 7:
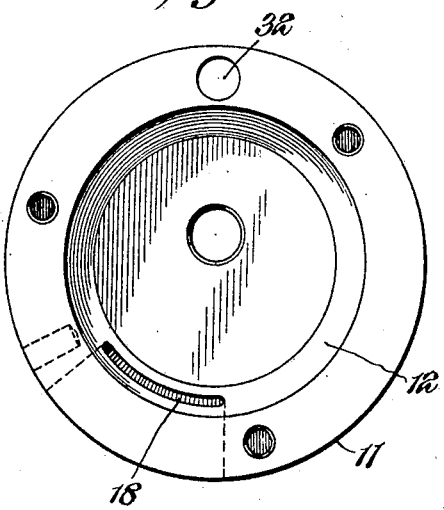

In said drawings: Figure 1 is a side elevation of the cutter holding means, the shank thereof being broken away, and illustrating a milling cutter in place thereon. Fig. 2 is a front elevation of the same. Fig. 3 is a rear elevation, with the shank shown in section. Fig. 4 is a longitudinal sectional view on the line 4—4 of Fig. 2. Fig. 5 is a cross sectional view on the line 5—5 of Fig. 4. Fig. 6 is a sectional view on the line 6—6 of Fig. 4. Fig. 7 is a rear elevation of the supporting member. Fig. 8 is a plan view showing the arrangement of the parts during the grinding operation.

In the embodiment illustrated, a mounting is employed comprising a shank or mandrel 9 which may be of any suitable character and adapted to be engaged with any chuck or head that will hold it stationary. This shank is provided with a head 10 provided with a peripherally beveled face. Rotatably mounted on the head is a support 11 provided with a tapered socket 12 to receive said head 10. The head is retained in the socket by means of a face plate 13 secured to the rear side of the support by screws 14 or other fasteners, the proper fit of said head being obtained by a washer 15 located between the head and face plate 13 and adjusted by suitable screws 16 that are threaded through the plate 13 and bear against the washer. The rotation of the support 10 upon the head 11 is limited by a pin 17 threaded into one side of said head and projecting through a radial slot 18 formed in one wall of the support. The length of said slot 18 determines the amount of movement of the head 11, but this amount of movement may be further limited by means of a stop plate 19 located on the periphery of the support and movable longitudinally over the slot. The plate 19 is also provided with a longitudinal slot 20 through which is passed a holding screw 21 threaded into the support and having on it a washer 22 which bears against the outer face of the plate and bridges the slot 20.

Projecting from the front face of the support 11 is a spindle 23, which is disposed eccentrically to the axis of movement of the support and is preferably in the form of a screw, threaded as shown at 24 into said support. The outer end of the screw has a head 25 notched as shown at 26 to receive a tool by means of which it may be turned. Rotatably mounted on this spindle is the cutter holding device, which comprises a hub 27 that fits snugly in the bore of a milling cutter and is journaled upon said spindle and held against detachment by the head 25, the hub having at its inner end an integral flange 28 that is located alongside the end of the support 11 and is preferably of the same diameter. The said flange is provided with a circular series of sockets or openings 29 and the support has a sliding locking bolt 30, the inner end of which engages in any of the sockets, thus securing the cutter holding device against rotation on the support and in different positions. The locking bolt 30 extends directly through the face plate 13, and has on its outer exposed end a suitable knurled head 31. The bolt passes through a socket 32 in the support, and carries a fixed collar or flange 33 located in the inner end of said socket. A coiled spring 34, arranged within the socket around the bolt, has its inner end bearing against the collar or flange 33, and its outer end bearing against the inner side of the face plate. This spring thus urges the bolt into the sockets.

The head 27 of the cutter holding device is adapted to fit snugly in a milling cutter, as for instance, 34ª, and it is provided with a key-way 35 arranged to aline with the key-way 36 of said milling cutter. A key as 37, engaged in the key-ways, serves to hold the cutter and hub against relative rotation, and this key is retained in place by a suitable nut 38 screwed upon the projecting end of the hub and also constituting means for holding the cutter in place. Where a thin cutter is employed, a washer as 39, may be located on the hub in rear thereof.

In practice, the number of sockets 29 in the cutter holding device is equal to the number of teeth of the milling cutter to be operated upon, and in using the tool, the parts are arranged substantially as shown in Fig. 8. The shank 9 is engaged in any suitable head, chuck or supporting device 40 by means of which it can be held in fixed relation, the tool being associated with the face of a suitable grinding wheel 41. If, for instance, an angular cutter of forty-five degrees is to be ground, the longitudinal axis of the tool is disposed at forty-five degrees to the axis of rotation of the grinding wheel. The cutter is placed in position as illustrated in Fig. 8 with one of the teeth in coaction with the face of the wheel. The support 11 is then grasped by the hand and rotated whereupon the cutter being secured eccentrically to said axis of rotation, will be moved so that the relief face will be ground. After having operated on one of the teeth, the locking bolt 30 is withdrawn, the cutter holding device is rotated until the next socket is in alinement with the bolt, and said bolt is engaged therein. The next tooth is then operated upon. When all of the teeth have been ground on one side, the cutter is merely reversed and the operation repeated on the other sides of the teeth. The movement of the support and consequently of the cutter is limited by the pin 17 in the slot 18. By adjusting the plate 19, sufficient movement is permitted to grind one tooth without letting the next come into engagement with the wheel.

It will be noted that in the present embodiment, the milling cutter holder, which is rotatable on its own axis, is also mounted on a rotatable support and is disposed eccentrically to the axis of rotation of said support. It will be evident that the desired grinding effect is secured upon the relief surfaces of a cutter placed on the support by this peculiar mounting and the movement obtained thereby. It will also be evident that the same effect is obtained, whether the eccentric movement is given to the cutter or to the grinding device, the only necessity being the relative eccentric rotation between the two.

From the foregoing, it is thought that the construction, operation and many advantages of the herein described invention will be apparent to those skilled in the art, without further description, and it will be understood that various changes in the size, shape, proportion, and minor details of construction, may be resorted to without departing from the spirit or sacrificing any of the advantages of the invention.

Having thus fully described our invention, what we claim as new, and desire to secure by Letters Patent, is:—

1. In means for grinding the relief surfaces of milling cutter teeth, the combination with a milling cutter holding device including an element that fits into the bore of a milling cutter for carrying such cutter, and means for movably supporting the holding device at an angle to a grinding member and causing it in its movement to have a path that is curved and eccentric to the axis of rotation of the milling cutter to carry the side clearance faces of the milling cutter teeth against the grinding member in a curved path.

2. In means for grinding the relief surfaces of milling cutter teeth, the combination with a rotary grinding member, of a milling cutter holding member including an element that fits into the bore of a milling cutter for carrying said cutter, and means for supporting the members in angular relation, said means permitting the relative movement of the members and causing the side clearance faces of the teeth of a milling cutter mounted on the element to be cut in a curve that is disposed eccentrically to the axis of rotation of the milling cutter.

3. In mechanism of the character set forth, the combination with a rotatable support, of a cutter holding device rotatably mounted on the support eccentrically to the axis of rotation of said support, and means for securing the holding device against rotation with respect to and in different positions on the support.

4. In means for grinding the relief surfaces of milling cutter teeth, the combination with a rotatable milling cutter holder arranged to fit in the bore of a milling cutter and having a key that engages in the keyway of such cutter, of a support on which the holder is mounted to rotate eccentrically to the axis of a cutter carried by said holder.

5. In mechanism of the character set forth, the combination with a support, of a cutter holding device rotatably mounted on the support and having a key-way with which the key-way of the cutter is alined, a key that engages in both keyways and a locking device for securing the cutter holding device against rotation on the support and in different positions.

6. In mechanism of the character set forth, the combination with a support having a limited rotation and also having a spindle, of a milling cutter holding device including a head arranged to fit in the bore of a milling cutter, said head being rotatable on the spindle and having a flange provided with sockets, a locking bolt movably mounted on the support and movable into the different sockets for holding the cutter holding device against rotation and in different positions, and means for securing a milling cutter against movement on the head.

7. In mechanism of the character set forth, the combination with a rotatable support having a spindle extending longitudinally of but eccentrically to its axis of rotation, of a milling cutter holder comprising a hub journaled on the spindle and adapted to receive a milling cutter, means for securing the cutter on said hub, and means for securing the hub against rotation on the support and in different positions.

8. In mechanism of the character set forth, the combination with a mounting, of a support rotatable on the mounting, means for limiting the rotary movement of the support, and means for rotatably mounting a rotary milling cutter on the support eccentrically to its axis of rotation and securing it in different positions on the rotatable support and against its rotary movement thereon.

9. In mechanism of the character set forth, the combination with a shank having a head, of a support rotatably mounted on the head and having a slot, a pin carried by the head and passing through the slot, an adjustable stop movable to different positions across the slot to limit the movement of the pin therein, said pin being carried by the support, and means for rotatably mounting the rotary cutter on the support and securing it in different positions and against its rotary movement thereon.

10. In mechanism of the character set forth, the combination with a mounting, of a support rotatable on the mounting, means for limiting the rotary movement of the support on the mounting, means for rotatably mounting a cutter on the support eccentrically to its axis of rotation, and means for securing such cutter in different positions and against its rotary movement on the support.

11. In mechanism of the character set forth, the combination with a shank arranged to be engaged in a tubular holding chuck and having a head, of a support having a rotatable mounting on the head and having a socket to receive the same, means for retaining the head in the socket, said support having a slot, a pin engaged in the slot, and carried by the head, said pin limiting the rotary movement of the support on the head, an adjustable stop for the pin mounted on the support and movable across the slot, a spindle projecting from the support and disposed eccentrically to the axis of rotation, a cutter holding hub rotatably mounted on the spindle and having a key-way, a cutter retaining nut mounted on the outer end of the hub, a flange carried by the inner end of the hub and associated with the head, said flange having an annular series of sockets, and a spring pressed locking bolt mounted on the head and detachably engaging in the socket.

12. In means for grinding the relief surfaces of milling cutter teeth, the combination with relatively rotatable members, one of which is mounted on the other, of a mandrel projecting longitudinally from one member and adapted to be held by a chuck or analogous device, a stem projecting in an opposite direction from the other member, and means carried by the stem for engaging in the bore of a milling cutter and securing said cutter on the stem.

13. In means for grinding the relief surfaces of milling cutter teeth, the combination with a mounting including a mandrel adapted to be held by an ordinary chuck or analogous holder, of means journaled on the mounting for holding a milling cutter, said means including a device that engages in the bore of said milling cutter and is disposed eccentrically to the axis of rotation of the means.

14. In means for grinding the relief surfaces of milling cutter teeth, the combination with a mounting, of a support surrounding and rotatable upon the mounting, and means projecting from the support eccentrically to its axis of rotation for engaging the bore of a milling cutter to secure said cutter upon the support eccentrically to its axis of rotation.

15. In means for grinding the relief surfaces of milling cutter teeth, the combination with a mounting, of a support rotatable upon the mounting, means for limiting the extent of the rotary movement, a stem projecting from the support eccentrically to its axis, a hub rotatably mounted on the stem and arranged to fit into the bore of a milling cutter, and means for securing the hub against rotation and in different positions with relation to the stem.

16. In means for grinding the relief surfaces of milling cutter teeth, the combination with a rotary grinding member, of a rotary milling cutter holding member including a device that engages in the bore of a milling cutter to secure the same on the member, said member having its axis of rotation disposed in angular relation to the axis of rotation of the grinding member, and means for rotating one of the members on an axis eccentric to its own axis of rotation to grind the relief surfaces of the teeth of a milling cutter placed on the holding member on a curve that is disposed eccentrically to the axis of rotation of said milling cutter.

In testimony, that we claim the foregoing as our own we have hereto affixed our signatures in the presence of two witnesses.

CHARLES E. KLINK.
CHARLES H. HERZOG.

Witnesses:
 GUS WALSER,
 JOHN M. BAUSCH.